May 15, 1956 F. B. WHITE 2,745,521
GASKET RETAINER FOR SEPARABLE MEMBERS
Filed Oct. 7, 1952
FIG. 1.
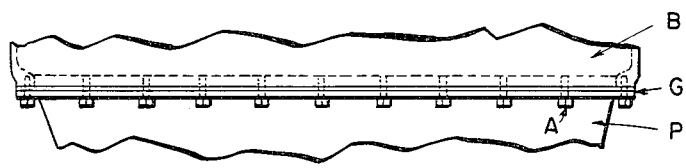
FIG. 2.
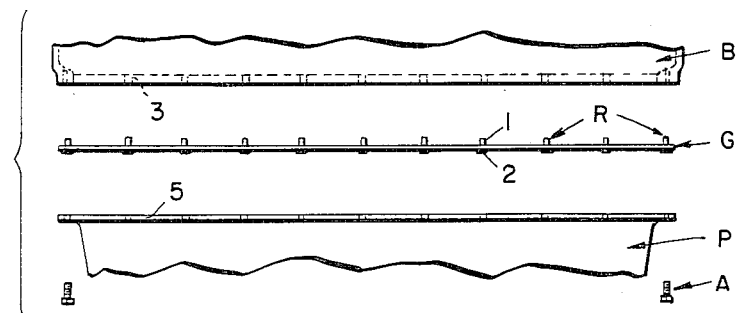
FIG. 3. FIG. 4.
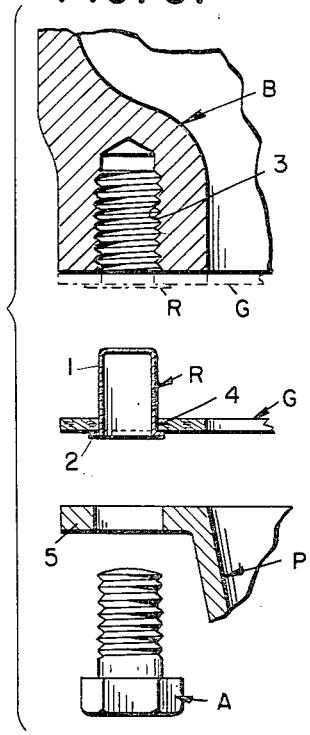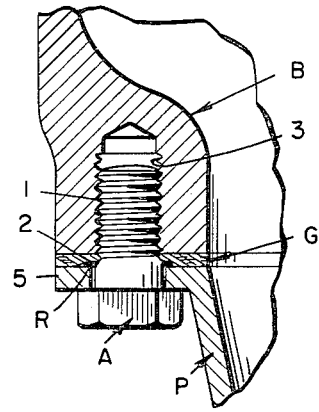
FIG. 5.
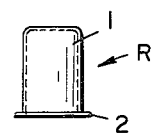
FIG. 6.
INVENTOR
FRANK B. WHITE
BY
ATTORNEY

United States Patent Office 2,745,521
Patented May 15, 1956

2,745,521

GASKET RETAINER FOR SEPARABLE MEMBERS

Frank B. White, Canoga Park, Calif., assignor of forty-five per cent to John J. Woodruff, Pacific Palisades, Calif.

Application October 7, 1952, Serial No. 313,435

3 Claims. (Cl. 189—36)

This invention relates, in its broadest aspect to and has for an object, the provision of a simple, novel, economical and effective device for holding a gasket in registration with bolt or screw holes on one of two separable members when one of said members is detached from the other.

A more specific object is to provide means for holding the conventional gasket on an automotive engine block as when the cylinder head or the grease pan is removed from the block for any purpose and without dislodgement of the usual gasket from a position whereat the holes in the gasket will remain in registration with the bolt or screw holes in the separable members.

It is well known that when, for example, an automotive engine is wholly or partly disassembled, the grease pan which is attached to the bottom of the block usually carries the gasket with it unless the gasket is adhesively affixed to the block. If not affixed to the block or even if it remains on the pan the gasket is readily displaced to an extent that the bolt or screw holes therein will be out of registration with the holes in the block and the pan. Hence, it is usually quite difficult to realign the gasket with said members, and if successfully accomplished is time consuming and expensive in labor cost.

Frequently, a gasket may stretch or deform at local points or throughout its area and occasion even greater difficulty than when a new gasket is employed to replace an old one.

It is an object, therefore, to provide simple and economical retainers adapted to be inserted from the bottom through some or all of the bolt holes in the gasket and extended into the threaded holes in the engine block and formed with enlargements or flanges underneath the gasket so as to frictionally hold the gasket on the bottom of the block when the pan is removed.

Preferably, said retainers are formed of tubular cross section with external annular flanges or extensions at their lower ends and of a more or less flexible and deformable plastic material of phenolic, acetone or other suitable derivatives, with walls of minimum thickness and of a diameter just slightly greater than the internal threads in the holes of the block. When so formed the retainers may be readily thrust upwardly through the holes in the gasket and into corresponding holes in the block, and the flanges will underlie and thus hold the gasket on the block with all holes of the gasket and block in registration for reception of bolts or screws extended through a flange on the pan for threaded attachment to the block.

The retainers are not removed when the pan is attached to the block but are deformed or cut into sections by the threads of the bolts or screws.

I have shown in the accompanying drawings a preferred embodiment of my invention in connection with an automotive engine, subject to modification and application to other devices than shown and described herein, within the scope of the appended claims and without departing from the spirit thereof.

In said drawing:

Fig. 1 is a fragmentary view of an engine block with the grease pan attached thereto;

Fig. 2 is an exploded view of the same showing the gasket between certain members equipped with my gasket retainers;

Fig. 3 is an exploded view with the parts of Fig. 2 shown in section and of substantially full size and separated one from the other;

Fig. 4 is a view of the parts shown in Fig. 3 attached;

Fig. 5 is an elevational view of one of the gasket retainers which is closed at an end thereof; and Fig. 6 is a view of a modified form of retainer which is open at both ends.

A gasket retainer R of preferred form and embodying my invention is best shown in Fig. 5 apart from a gasket and is formed of a suitable plastic material with a tubular stem 1 and external annular flange 2 at one end of the hollow stem 1. The wall of said stem and also said flange are formed of as thin material as possible and the opposite end of the stem may be either open or closed.

The diameter of the stems 1 is but slightly greater than that of the threaded holes 3, 3, etc., in the bottom of an engine block B and corresponding holes 4, 4, etc. in a gasket G which is usually applied between block B and a grease pan P. Thus, when the pan is removed from block B a desired number of retainers R may be thrust upwardly through holes 4, 4, etc. of the gasket G into holes 3, 3, etc. of block B with the flanges 2 of the retainers underlying the gasket. The retainer stems 1 will flex and deform as the retainers seat in holes 3, 3 and when frictionally engaging the threads of holes 3, 3, will thus hold gasket G in close contact with the bottom surface of block B and all holes of the block and gasket in registration so as to readily receive bolts or screws A when they are forced upwardly through flange 5 of pan P and holes 4 of gasket G into holes 3 of block B.

When bolts A are tightened the pressure applied to flanges 2 of retainers R caused the retainer flanges to be countersunk into the gasket and not in interference with provision of a leak proof joint between the block and pan.

As mentioned hereinbefore the retainers R are formed of a suitable plastic, rubber or other readily deformable and conformable material of film or paper thickness yet having sufficient strength and rigidity that they may be easily forced through holes 4 of the gasket and into holes 3 of the block. When inserted in holes 3 as shown the bolts A are forced upwardly and screwed into the retainers, the stems 1 of the retainers being thereby either deformed to correspond to the contour of the threads or perhaps cut by the threads as the case may be. In all events the retainers do not impede or resist the thrust of the bolts into the block but actually cause the bolts to seat more tightly than if the retainers were absent.

In conventional practice, when a pan P is removed the gasket drops from the block or remains on the pan and in either case is usually removed before reattaching the pan to the block. When so removed the gasket may become stretched or contracted at different local points or generally, and in many cases damaged, and if not then usable must be replaced by a new gasket. In all cases the replacement of an old gasket or its replacement by a new gasket entails substantial loss in cost of labor and gasket, as well as time and unnecessary delay.

The essence of the invention herein disclosed is in the provision of retaining means insertible through a gasket and into a bolt or screw receiving hole of a first member for holding a gasket in operative position while a second member is detached from the first member and into which retaining means bolts or screws are extensible for attaching the first and second members together with a gasket confined therebetween.

I claim:

1. The combination with a pair of separable members and a gasket therebetween, of a plurality of retainers having tubular stems in holes in said gasket and in threaded holes in a first member and extensions from said stems underlying said gasket, and attaching bolts extended through a second member and said gasket into threaded connection with said threaded holes in said first member which contain said tubular stems, for attaching said members together and confining said gasket between said members, said stems being deformed between the threads of said holes and said bolts.

2. The combination with a pair of separable members and a gasket therebetween, of a plurality of retainers having tubular stems in holes in said gasket and into threaded holes in a first member and extensions from said stems underlying said gasket, and attaching bolts extended through a second member and said gasket into threaded connection with said threaded holes in said first member which contain said tubular stems, for attaching said members together and confining said gasket between said members, said stems being deformed between the threads of said holes and said bolts, said retainers being formed of plastic material and of tubular cross section capable of deformation at local points on their stems for ready conformation with the contour of the bolt or screw receiving holes in said first member when said bolts or screws are screwed into said first member.

3. The combination with a pair of separable members and a gasket therebetween, of a plurality of retainers having tubular stems in holes in said gasket and into threaded holes in a first member and extensions from said stems underlying said gasket, and attaching bolts extended through a second member and said gasket into threaded connection with said threaded holes in said first member which contain said tubular stems, for attaching said members together and confining said gasket between said members, said stems being deformed between the threads of said holes and said bolts, said retainers being formed of plastic material and of tubular cross section capable of deformation at local points on their stems for ready conformation with the contour of the bolt or screw receiving holes in said first member when said bolts or screws are screwed into said first member, said retainers supporting the gasket on said first member when said second member is detached, so as to hold the gasket in operative position for attaching said members and confining the gasket therebetween to seal the joint between said members.

References Cited in the file of this patent

UNITED STATES PATENTS

| | | |
|---|---|---|
| 2,001,290 | Thomson | May 14, 1935 |
| 2,399,526 | Warren | Apr. 30, 1946 |
| 2,491,085 | Burrows | Dec. 13, 1949 |
| 2,639,832 | Bergstrom | May 26, 1953 |